United States Patent [19]

Dupont-Delhovren

[11] Patent Number: 5,567,466
[45] Date of Patent: Oct. 22, 1996

[54] ANIMAL FOOD COMPOSITIONS AND PREPARATION THEREOF

[75] Inventor: Nathalie Dupont-Delhovren, Beauvillé, Belgium

[73] Assignee: Nestec S.A., Vevey, Switzerland

[21] Appl. No.: 367,469

[22] Filed: Dec. 30, 1994

[30] Foreign Application Priority Data

Jan. 24, 1994 [EP] European Pat. Off. .............. 94100959

[51] Int. Cl.$^6$ ................................. A23K 1/10; A23L 1/31
[52] U.S. Cl. ........................ 426/641; 426/618; 426/623; 426/802
[58] Field of Search .................................. 426/641, 618, 426/623, 802

[56] References Cited

U.S. PATENT DOCUMENTS

| | | | |
|---|---|---|---|
| 3,946,123 | 3/1976 | Hanna | 426/646 X |
| 4,539,210 | 9/1985 | O'Connell et al. | 426/56 |
| 4,781,939 | 11/1988 | Martin et al. | 426/646 |
| 4,791,002 | 6/1988 | Baker et al. | |

OTHER PUBLICATIONS

The Canadian Patent Office Record, claims of Canadian Patent Document No. 560,490, Hallinan, et al. (1958).

*Primary Examiner*—Esther Kepplinger
*Assistant Examiner*—Choon P. Koh
*Attorney, Agent, or Firm*—Vogt & O'Donnell, LLP

[57] ABSTRACT

An animal food composition is prepared from a mixture of from 55% to 85% meat and meat by-product and from 10% to 25% cereal ingredients by weight. The mixture is emulsified at a temperature less than 15° C. to obtain an emulsified paste which then is pumped to a frame system for containing and shaping the paste. The framed contained paste is cooked to coagulate the paste into a coagulated shaped form, the coagulated shaped paste is cut into pieces suitable for being cut into chunks, the pieces are cooled to harden the pieces, and the hardened pieces are cut into chunks which may be carried out particularly so that irregularly shaped chunks are obtained. A further food product is prepared by filling the chunks in a container together with a sauce or base, and the container and contents are heated to sterilize the contents.

15 Claims, No Drawings

ANIMAL FOOD COMPOSITIONS AND PREPARATION THEREOF

BACKGROUND OF THE INVENTION

The invention relates to a sterilized animal feed composition containing irregular chunks and sauce or a base. The invention additionally relates to the process for the preparation of this composition.

Patent European Patent Application Publication No. 265,740 already relates to a process for the preparation of irregular chunks for feeding animals. The disadvantage of this process is that it requires the addition of a large amount of dry protein substances (between 15 and 35% by weight), which results in a more expensive composition, and, moreover, the formulation is restrictive, because this content of protein substances is absolutely necessary to enable this process to be implemented.

SUMMARY OF THE INVENTION

The aim of the present invention is to make possible the preparation of a composition containing irregular chunks, with a low fines presence and requiring no or only a small amount of addition of protein substances.

The invention relates to a sterilized animal feed composition containing chunks and sauce or a base, the said chunks being prepared from a mixture of 55 to 85% of meat and meat by-products, of 10 to 25% of cereals and between 0 and 15% of water, the said chunks being irregular with clean cuts and without breakages, 97% of the said chunks having a size such that they do not pass through a screen with a mesh opening of 4 mm and between 40 and 70% of these chunks having a shape which is not a right-angled geometric volume.

The invention additionally relates to a process in which meat, meat by-products, cereal and water, as described above, are mixed, emulsified, pumped to a frame system to obtain a framed contained paste which then is cooked and thereafter, cut into pieces suitable for being cut into chunks which then are cooled for hardening the pieces which then are cut to obtain chunks. The chunks obtained are mixed with a sauce or base, a container is filled with the product and sterilization is carried out.

DETAILED DESCRIPTION OF THE INVENTION

In the present description, meat and meat by-products are understood to mean all the fleshy parts of slaughtered warm-blooded animals in the fresh state or preserved by an appropriate treatment and all the products and by-products arising from the processing of the bodies or body parts of warm-blooded animals. Meat is understood to mean in particular the meat from chickens, rabbits, bovines or ovines and offal. Offal is understood to mean lung lobes as well as livers or kidneys. Meat by-products is understood to mean the meal obtained from carcasses of the abovementioned animals. In the present description, fish and fish by-products will be regarded as coming within the definition of meat and meat by-products. Fish and fish by-products are understood to mean fish or fish parts in the fresh state or preserved by an appropriate treatment, as well as the by-products of their processing. Salmon or sardines can be used as fish and fish meal can be used as by-products.

If fish or fish by-products are used, they are used in a proportion of at most 15%.

In the present description, all the percentages are by weight.

"Cereals" is understood to mean all the species of cereals, whatever their appearance, or the products obtained by the processing of the farinaceous kernel of cereals. Use is preferably made of wheat, maize, or rice, as well as of their flour.

The chunks of the composition according to the invention contain less than 3% of particles having sizes of less than 4 mm. It is clearly understood that, depending on whether the composition is intended for cats or for dogs, the size of the chunks will be different. For dogs, 50 to 60% of the chunks will not pass through a screen with a mesh opening of 16 mm. For cats, on the other hand, only 5 to 15% of the chunks will not pass through a screen with a mesh opening of 14 mm, 45 to 65% of the chunks having a size of between 8 and 14 mm.

The aim of the invention is also to obtain a composition with irregular chunks, that is to say containing from 40 to 70% of chunks which have a shape which is not a right-angled geometric volume, namely from 40 to 70% of chunks which are neither cubes nor right-angled parallelepipeds but have any three-dimensional shape.

The chunks present are combined in a sauce or a base. Sauce is understood to mean a mixture containing up to 98% of water, the remainder being one or more thickeners, such as hydrocolloids, dyes and flavouting agents. Base is understood to mean a mixture based on 60 to 80% of water and 20 to 40% of finely ground meats, the remainder being gelling agents, dyes and aromas.

The chunks present in the composition can also be prepared from a mixture additionally containing between 0 and 5% of vegetable protein extract. Vegetable protein extract is understood to mean all the products of plant origin, the proteins of which have been concentrated by an appropriate treatment, which contain at least 50% of crude proteins with respect to the dry matter and which may have been restructured. The proteins used are, for example, wheat or maize gluten or soya isolate.

In a preferred embodiment, the chunks are prepared from a mixture containing 58 to 68% of meat and meat by-products, between 16 and 25% of cereals, between 2 and 5% of vegetable protein extracts and between 5 and 14% of water. The meats and meat by-products preferably comprise a minimum of 10% of pig or beef liver and from 0 to 5% of powdered pig or beef plasma and the cereals are present in a proportion of at least 10%, the said cereals being wheat, maize or rice flours, which makes it possible to ensure that the chunk at the cutting off has a sufficient texture and to avoid the production of fines and of tears.

The powdered plasma can advantageously be substituted by at least 2% of vegetable protein extracts which play the same role as the plasma.

The chunks can additionally contain up to 3% of dyes, vitamins and inorganic salts.

In the composition, the chunks are present in a proportion of between 20 and 50%, the remainder being the sauce or the base.

In the case of a composition with sauce, the chunks are present in a proportion of 40 to 50% whereas, with a composition with base, the chunks are present in a proportion of 20 to 40%.

In the mixture for preparing the chunks, the water content will be adjusted to between 0 and 15% according to the meat and cereal contents, in order to obtain a final moisture level of the chunks of between 50 and 60% and preferably between 52 and 58%, in order to ensure a correct content of the emulsion in the manufacturing process.

In the process of the invention, before mixing the meat and meat by-products, a size reduction of the said meats is carried out in order to arrive at sizes of the order of 12 mm. The meats (and optionally also the fish) are then mixed with the other ingredients (optionally also the vegetable protein extracts) of the chunk composition until homogenized, in order to obtain an elastic paste.

Emulsification is then carried out with a doubleg-grid emulsifier (for example of the Karl Schnell type). Emulsification takes place at a maximum temperature of 15° C. This stage is necessary to avoid the downstream separation of the fats.

The emulsified paste is then pumped, with or without deaeration, to a continuous shaping system which makes it possible to extrude puddings of oval, rectangular or square cross-section which can be fitted in a 20×20 mm frame. The framed pudding paste thus obtained is cooked by any continuous cooking system (for example, hot air, steam, hot air and steam or microwave system) in order to obtain a core temperature of between 80° and 95° C. In order to do this, use is made of a tunnel oven brought to a temperature of between 90° and 120° C. The puddings are thus congealed by coagulation and can be sliced at the outlet of the cooking device. The cooked cooagulated paste is then continuously cut at the outlet of the cooking system into congulated pieces with a length of 40 to 400 mm. The elongated pieces are then hardened by cooling to a temperature of between 10° and 40° C.: the cooling is preferably carried out with water by spraying or immersion in order to prevent the chunks from sticking to one another.

It finally remains to cube the cooled pieces. In order to do this, use is made of a cuber known in the state of the art, such as the Urschel cuber. The pieces are fed continuously onto the belt of the cuber by dropping the pieces in bulk and randomly onto this belt. The belt is preferably constantly sprayed with water to facilitate passage of the pieces and to prevent them from sticking in the machine.

The final chunks obtained are irregular, both in their size and in their shape. The choice of the cross-section of the pieces with respect to the choice of the lateral and transverse cut sizes of the cuber defines the irregularity of the shape. The choice of the length of the pieces defines the irregularity of the size.

The irregular chunks thus obtained are mixed in a way known per se with the sauce or the base and containers are filled with different volumes according to whether manufacture is being carried out for cats or dogs. The composition is finally sterilized conventionally at a temperature of between 120° and 135° C. for 20 to 100 min.

EXAMPLES

The continuation of the description is made with reference to the examples.

EXAMPLE 1

Cat composition

A mixture is prepared from 73% of poultry carcass, pig lungs and beef liver (ground), 16% of wheat flour, 2% of powdered beef plasma, 6.8% of water and 2.2% of dyes, vitamins and inorganic salts. This mixture is emulsified at 12° C. and extruded in the form of a pudding paste having a square cross-section with a side of 12 mm. This pudding paste is cooked at a temperature of 90° C. (tunnel at 100° C.), and pieces with a length of 80 mm are cut. They are cooled to 30° C. and cut in the cuber in order to obtain irregular chunks, 3% of which have a size of less than 5 mm, 30% of which have a size of between 5 and 11 mm, 55% of which have a size of between 11 and 14 mm and 12% of which have a size greater than 14 mm. 45% of these chunks are mixed with 55% of sauce prepared from 98% of water, 1% of dye and 1% of guar gum.

Tinplate cans are filled and sterilized at 125° C. for 40 min.

EXAMPLE 2

Cat composition

A mixture is prepared from 56% of poultry carcass, pig lungs and pig liver (ground), 13% of fish, 16% of wheat flour, 2% of plasma, 10.8% of water and 2.2% of dyes, vitamins and inorganic salts. The preparation is then carried out as in Example 1, in order to obtain irregular chunks of the same size as those of Example 1. 30% of these chunks (having a water content of 58%) is incorporated in a base prepared from 23% of poultry carcass, 1% of gelling agent, 1% of dye and aroma and 75% of water.

Tinplate cans are then filled and sterilized at 127° C. for 60 min.

EXAMPLE 3

Dog composition

69% of poultry carcass, beef lungs and pig liver is mixed with 20% of wheat flour, 1% of powdered beef plasma, 7.8% of water and 2.2% of dyes, vitamins and inorganic salts. This mixture is emulsified at 12° C. and extruded in the form of a pudding paste having a rectangular cross-section of 17×9 mm. This pudding paste is cooked at a temperature of 90° C. (tunnel at 100° C.), and pieces with a length of 80 mm are cut. They are cooled to 30° C. and cut in the cuber in order to obtain irregular chunks, 3% of which have a size of less than 5 mm, 37% of which have a size of between 5 and 16 mm and 60% of which have a size greater than 16 mm.

50% of these chunks are mixed with 50% of sauce prepared from 98% of water, 1% of dye and 1% of guar gum. Tinplate cans are filled and sterilized at 125° C. for 60 min.

I claim:

1. A process for preparing an animal food composition comprising:

preparing a mixture of ingredients comprising, by weight, from 55% to 85% meat and meat by-product and from 10% to 25% farinaceous cereal to obtain a paste mixture;

emulsifying the paste mixture at a temperature no higher than 15° C. to obtain an emulsified paste;

pumping the emulsified paste to a frame system for containing and shaping the emulsified paste to obtain a framed, contained paste;

heating the framed, contained paste to coagulate the paste to obtain a coagulated shaped paste;

cutting the coagulated shaped paste into pieces suitable for being cut into chunks;

cooling the pieces to a temperature of between 10° C. and 40° C. for hardening the pieces to obtain hardened pieces; and cutting the hardened pieces to obtain chunks.

2. A process according to claim 1 wherein the cereal is a member selected from the group consisting of wheat, maize, and rice.

3. A process according to claim 1 wherein the ingredient mixture further comprises up to 15% added water by weight.

4. A process according to claim 1 wherein the framed contained paste is heated to a core temperature of between 80° and 95° C.

5. A process according to claim 1 wherein the coagulated shaped paste is cut into pieces having a length of between 40 mm and 400 mm.

6. A process according to claim 1 further comprising cutting the hardened pieces randomly so that the chunks obtained are irregularly shaped.

7. A process according to claim 1 further comprising:
   filling a container with the chunks together with a food substance selected from the group consisting of a sauce and a base to obtain a container and contents; and
   heating the container and contents to sterilize the contents.

8. A process according to claim 1 or 7 further comprising cutting the hardened pieces so that the chunks obtained are irregularly shaped and so that less than 3% of the chunks pass through a screen having a mesh opening of 4 mm.

9. A process according to claim 1 wherein the ingredient mixture further comprises a vegetable protein extract in an amount of up to 5% by weight.

10. A process according to claim 1 wherein the meat comprises at least 10% liver selected from the group consisting of pig liver and beef liver.

11. A process according to claim wherein the meat by-product comprises up to 5% powdered plasma selected from the group consisting of pig and beef plasma.

12. A process according to claim 1 wherein the ingredient mixture comprises from 58% to 68% meat and meat by-product, between 16% and 25% cereal, between 2% and 5% vegetable protein extract and between 5% and 14% added water.

13. A process according to claim 7 wherein the chunks are combined with the food substance in an amount of between 20% and 50%, by weight, based upon the combined weight of the chunks and food substance.

14. A process according to claim 7 wherein the food substance is a sauce and the chunks are combined with the sauce in an amount of from 40% to 50%, by weight, based upon the combined weight of the chunks and food substance.

15. A process according to claim 7 wherein the food substance is a base and the chunks are combined with the base in an amount of 20% to 40%, by weight, based upon the combined weight of the chunks and food substance.

* * * * *

UNITED STATES PATENT AND TRADEMARK OFFICE
CERTIFICATE OF CORRECTION

PATENT NO.  : 5,567,466
DATED       : October 22, 1996
INVENTOR(S) : Nathalie DUPONT-DELHOVREN It is certified that error appears in the above-identified patent and that said Letters Patent is hereby corrected as shown below:

Column 3, line 29 (i.e., the line which begins "cut at..."), delete "congulated" and insert therefor --elongated--.

Column 6, line 4 (line 1 of claim 11), after "claim", insert --1--.

Signed and Sealed this

Seventh Day of January, 1997

Attest:

BRUCE LEHMAN

Attesting Officer

Commissioner of Patents and Trademarks